United States Patent
Zhang et al.

(10) Patent No.: US 8,654,141 B2
(45) Date of Patent: Feb. 18, 2014

(54) TECHNIQUES FOR ADAPTING A COLOR GAMUT

(75) Inventors: Yanli Zhang, San Jose, CA (US);
Akihiro Takagi, San Mateo, CA (US);
Sunil Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 12/655,354

(22) Filed: Dec. 29, 2009

(65) Prior Publication Data

US 2011/0157212 A1     Jun. 30, 2011

(51) Int. Cl.
*G09G 5/02* (2006.01)
*G09G 5/10* (2006.01)

(52) U.S. Cl.
USPC .................. 345/590; 345/589; 345/691

(58) Field of Classification Search
USPC .......................... 345/589, 590, 691
See application file for complete search history.

(56) References Cited

U.S. PATENT DOCUMENTS

| | | | |
|---|---|---|---|
| 7,064,864 B2 * | 6/2006 | Takahashi et al. ............. | 358/1.9 |
| 2002/0044293 A1 | 4/2002 | Fukasawa | |
| 2006/0103862 A1 | 5/2006 | Kurumisawa et al. | |
| 2007/0081177 A1 | 4/2007 | Um et al. | |
| 2008/0030526 A1 * | 2/2008 | Brown Elliott et al. ...... | 345/694 |
| 2009/0244113 A1 * | 10/2009 | Bergquist et al. ............. | 345/691 |

FOREIGN PATENT DOCUMENTS

| | | |
|---|---|---|
| CN | 1581280 A | 2/2005 |
| CN | 1770874 A | 5/2006 |
| EP | 1981259 A2 | 10/2008 |
| EP | 1981287 A2 | 10/2008 |
| WO | 2007/083717 A1 | 7/2007 |

OTHER PUBLICATIONS

"International Color Consortium", Document retrieved on Dec. 18, 2009, Webpage available at: http://www.color.org/index.xalter.
"VESA Enhanced Extended Display Identification Data Standard (Defines EDID Structure Version 1, Revision 4)", E-EDID™ Standard, Release A, Revision 2, Sep. 25, 2006, Sections 1.4 and 3.7.
Office Action Received in Great Britain Application No. GB1021886.5, mailed on May 4, 2012, 2 pages.
Combined Search and Examination Report received for the United Kingdom Patent Application No. 1021886.5, mailed on Apr. 26, 2011, 9 pages of Combined Search and Examination Report.
Office Action Received for Chinese Patent Application No 201010624951.8, mailed on Jan. 30, 2013, 8 Pages of Chinese Office Action and 14 Pages of English Translation.

(Continued)

*Primary Examiner* — David T Welch
*Assistant Examiner* — Matthew D Salvucci
(74) *Attorney, Agent, or Firm* — Glen B. Choi

(57) ABSTRACT

Techniques are described that can be used to provide color space conversion for images and video to a display color gamut space. Some techniques provide for accessing an sRGB gamut color table, determining a color conversion matrix based on the sRGB gamut color table and chromaticity values of RGBW primary and gamma stored in the display or associated with the display, applying color space conversion to the pixels for pixels using the color conversion matrix, and applying linear correction of pixels by applying a normalization factor to the color conversion matrix. In addition, some techniques provide analysis of content gamut with respect to display gamut in HSV space, adjustment in HSV space, and conversion back to RGB space before applying color space conversion.

16 Claims, 7 Drawing Sheets

(56) References Cited

OTHER PUBLICATIONS

Office Action Received for Chinese Patent Application No. 201010624951.8, mailed on Aug. 13, 2013, 7 Pages of Chinese Office Action including 4 pages of English Translation.

Office Action Received in German Patent Application No. 102010055454.5, mailed on Dec. 12, 2012, 8 pages of Office Action and 5 pages of English Translation.

"HP LP2480zx LCD Monitor", User Guide, first edition, Mar. 2008, 60 pages.

COLANTONI, "Color Space Transformations", 2004, pp. 1-28.

* cited by examiner

TECHNIQUES FOR ADAPTING A COLOR GAMUT

FIELD

The subject matter disclosed herein relates generally to color gamut and more particularly to color gamut conversion.

RELATED ART

A gamut is a complete subset of colors defined by a three dimensional volume. The sRGB color space is a standard well known definition of color space. Many content color spaces conform to sRGB primaries such as a photo saved in sRGB space and video in ITU-R Recommendation BT.709 format or xvYCC format. However, some content color space does not conform to sRGB primaries but instead other formats such as AdobeRGB space. In many cases, color gamut spaces of content and displays do not match. For example, many notebook computer displays have a gamut less than sRGB color space. Some high end notebooks have wide color gamut displays with gamut larger than sRGB color space.

FIG. 1 depicts an example of display and content gamut spaces shown in the xy plane of CIE 1931 Yxy space. The display gamut is defined by the triangle 123 whereas content gamut space is defined by the triangle 1'2'3'. In Yxy color space, Y represents brightness and x and y represent chromaticity values. If the content gamut boundary is the same as the display gamut represented by triangle 1'2'3', then no gamut mapping is needed for true-to-source color reproduction.

However, in the example of FIG. 1, the display gamut space is less than content color space, which is usually the case for mainstream notebooks and mobile internet devices. If no gamut mapping is performed, content color will be compressed, resulting dull and de-saturated color.

When display gamut is larger than content color space, if no gamut mapping is performed, then content color will be expanded, resulting in over-saturated colors. In some cases, the over-saturated color is pleasing to eyes. However, in some cases, the true-to-life color is preferred and accurate gamut mapping is needed.

Operating System (OS) color management system and color-aware applications provide color gamut transformations. Microsoft's operating systems such as Vista and Windows 7 and Apple's OS have color management modules accessible using application program interfaces (API). Microsoft Windows 7 color management performs color corrections if a customized display ICC profile is available and associated with the display. Those color management modules require customized display profiles with chromaticity values of RGBW primary and gamma values. Building a customized ICC profile requires an expensive color measurement tool and knowledge in color. It is not easy even for a knowledgeable computer user. Many standard video applications for Windows are not color-aware, such as Internet Explorer (IE). This means the colors in video and IE are not corrected even when a customized display profile is available.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
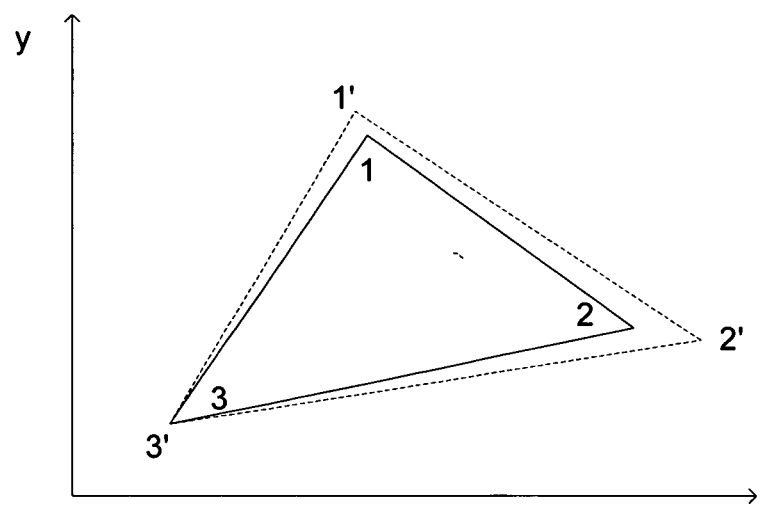
FIG. 1 depicts an example of display and content gamut spaces shown in the xy plane of CIE 1931 Yxy space.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide automatic gamut mapping from content gamut to display gamut for both narrow and wide color gamut contents and displays. Some embodiments provide for accessing an sRGB gamut color table, determining a color conversion matrix based on the sRGB gamut color table and chromaticity values of RGBW primary and gamma stored in the display or associated with the display, applying color space conversion to the pixels for pixels using the color conversion matrix, and applying linear or non-linear correction to pixel saturation values. Some embodiments provide for reading chromaticity values of RGBW primary and gamma stored in the display or associated with the display, determining a maximum display saturation for colors, applying adaptive gamut mapping to the content based on the display characteristics, and applying correction of pixel saturation values of colors based on the maximum display saturation. Accordingly, various embodiments provide a content adaptive gamut mapping techniques which can produce more vivid and accurate color on displays with less than sRGB gamut and more true-to-life color on wide color gamut displays.

In various embodiments, a graphics driver reads panel characteristics stored in Extended Display Identification Data (EDID) and the graphics driver programs graphics hardware to map content color to destination display RGB space. EDID is a data structure provided by a display to describe its capabilities to a graphics card and is defined in VESA E-EDID Version 1, Rev 4 (2006).

Various embodiments may not use a customized display profile. The default standard sRGB profile can be used for color correction. Color correction can take place automatically by the graphics hardware and driver based on the display information stored in the EDID. In addition, various embodiments provide color correction for video when the video application is not color-aware. Various embodiments are compatible with the color management system of an OS or applications such as Adobe.

In various embodiments, sRGB color space is used as a bridge to convert non-sRGB graphics content to destination display color gamut by using sRGB color space in a color management system. For non-sRGB graphics content, color aware applications are used to convert non-sRGB content to sRGB color space first. For video content, the application does not need to be color aware because the video source color space (BT. 601, BT.709, xvYCC) can be detected by graphics driver. When converting from non-sRGB to sRGB space, the converted pixel data can be saved in memory or carried forward in the graphic pipe in a way that the out of range values are not clipped. For example, converting from pixels in 0-1 range in AdobeRGB space to sRGB space can result in pixel values that are less than 0 or larger than 1.

Figure 2:
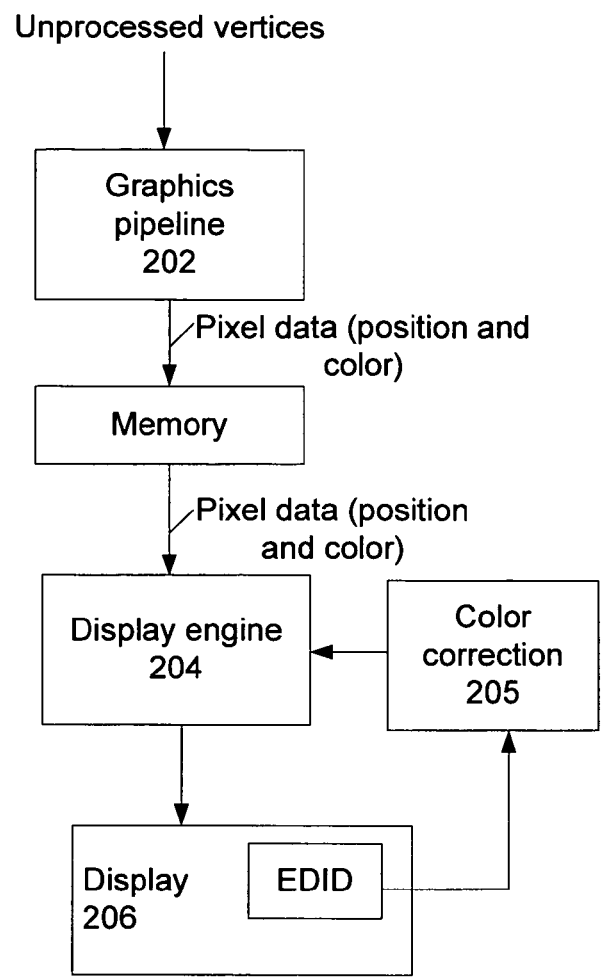
FIG. 2 depicts an example system in which embodiments can be used.

FIG. 2 depicts an example system in which embodiments can be used. Graphics pipeline 202 can receive unprocessed vertices from an application or other source. For example, unprocessed vertices can be received via a wired or wireless interface (not depicted). Pipeline 202 receives unprocessed vertices and provides rasterized pixels for display. For example, pipeline 202 can be compatible with Segal, M. and Akeley, K., "The OpenGL Graphics System: A Specification (Version 2.0)" (2004), The Microsoft DirectX 9 Programmable Graphics Pipe-line, Microsoft Press (2003), and Microsoft® DirectX 10 (described for example in D. Blythe, "The Direct3$^D$ 10 System," Microsoft Corporation (2006)) as well as variations thereof. DirectX is a group of application program interfaces (APIs) involved with input devices, audio, and video/graphics. Pipeline 202 can be implemented using any of or a combination of graphics processor, central processing unit, and/or graphics processor executing general computing instructions. Pipeline 202 provides pixels into a memory region (not depicted). The pixels can be made available for processing by display pipeline 204.

In some embodiments, sRGB can be set as the default display color space in the OS color management module. In this way, non-sRGB content can be color converted if the application and OS is color-aware. Non-sRGB content can be converted to sRGB space and stored in the memory before transmitted to the display engine.

Display engine 204 can modify pixel color data and output pixels for display by display 206. For example, display engine 204 can perform at least inverse gamma correction, color space conversion, and gamma correction. In various embodiments, display engine 204 includes the capability to perform color correction when converting from content gamut space to gamut space of display 206 based on panel chromaticity and gamma data from extended display identification data (EDID) stored in a memory of display 206. Description of a manner of color space conversion is described with regard to FIGS. 3A and 3B.

Figure 3A:
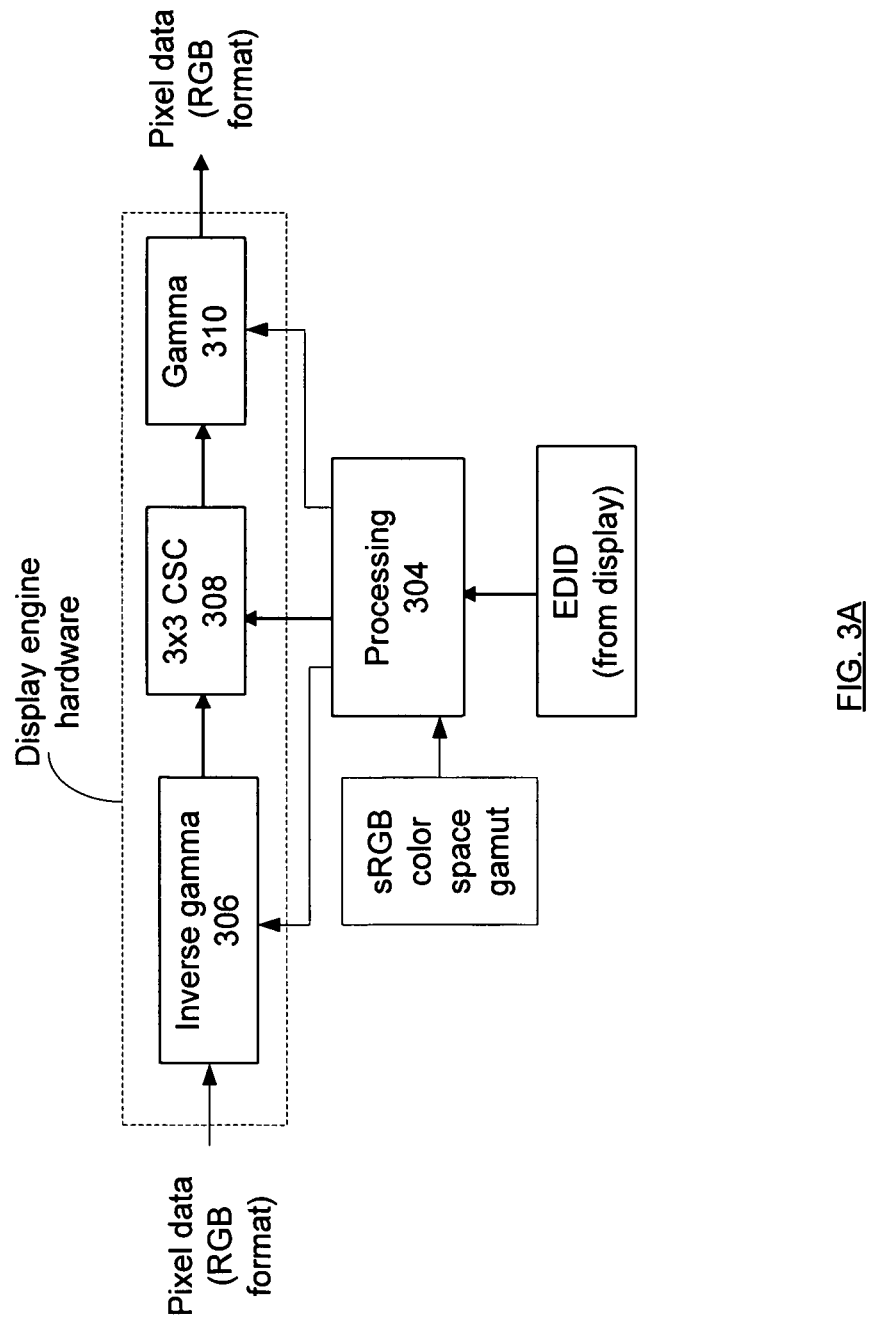
FIG. 3A depicts an example of a system that can be used to perform color correction when converting color of pixels from content gamut space to display gamut space and also apply linear correction during conversion.

FIG. 3A depicts an example of a system that can be used to perform color correction when converting color of pixels from content gamut space to display gamut space and also apply linear correction during conversion. The system receives pixel data in red-green-blue (RGB) format from an application or operating system (OS) or other source. Other color formats besides RGB can be used. The pixels can be provided from a memory or provided in a stream.

Displays compliant with Section 3.7 of VESA E-EDID Version 1, Rev 4 (2006) include or have access to a memory that stores RGBW primary chromaticity values described as x, y and gamma value in a timing controller (TCON) or an EEPROM integrated circuit coupled to a display. The gamma value in the core elements can be represented by one number for white gamma or three look up tables of individual R, G, B, and gamma. In other embodiments, chromaticity values of RGBW primary and gamma associated with a display can be stored elsewhere in the display, in a host system, memory external to the display, available for download from the internet or network, or available from another source.

sRGB color space gamut information can be stored in memory in a display or in the host system, graphics engine, or display engine.

Processing block 304 may perform: (1) reading panel chromaticity and gamma data from the EDID in memory as well as sRGB color space gamut information, (2) determining 3×3 Color Space Conversion (CSC) coefficients and programming registers of 3×3 CSC block 308, (3) programming look up tables used in the inverse gamma of inverse gamma block 306, and (4) programming look up tables used in the gamma table of gamma block 310.

Techniques used by processing block 304 to generate matrix coefficient values for 3×3 CSC block 308 are based on the chromaticity values (x, y) of content gamut space and the display gamut space. In various embodiments, the content gamut space is pre-defined as standard sRGB space and the chromaticity values of sRGB space have a standard definition specified in Table 1.

TABLE 1

| Chromaticity | Red | Green | Blue | White point |
|---|---|---|---|---|
| X | 0.6400 | 0.3000 | 0.1500 | 0.3127 |
| Y | 0.3300 | 0.6000 | 0.0600 | 0.3290 |

The chromaticity values of display gamut can be obtained from the EDID of a display. EDID contains chromaticity values for red, green, blue, and white and also contains gamma information for each of red, green, blue, or white.

To keep colors unchanged during conversion, XYZ color space can be used as a bridge to derive the mapping matrix for converting from source RGB space, e.g., sRGB, (denoted as space 1) to destination RGB space (denoted as space 2) (i.e., display space), as shown in the equations below:

$$\begin{bmatrix} X \\ Y \\ Z \end{bmatrix} = M_1 \begin{bmatrix} r_1 \\ g_1 \\ b_1 \end{bmatrix} = M_2 \begin{bmatrix} r_2 \\ g_2 \\ b_2 \end{bmatrix} \Rightarrow \begin{bmatrix} r_2 \\ g_2 \\ b_2 \end{bmatrix} = M_2^{-1} M_1 \begin{bmatrix} r_1 \\ g_1 \\ b_1 \end{bmatrix}$$

where, $M_1$ is the conversion matrix from RGB space 1 to XYZ space, $M_2$ is the conversion matrix from RGB space 2 to XYZ space, $r_1, g_1, b_1$ are pixels values from the content space, and $r_2, g_2, b_2$ are pixels values after conversion which can be sent for display or can be stored for display at another time.

To convert from RGB space 1 (i.e., content gamut space) to RGB space 2 (i.e., display gamut space), the coefficient mapping matrix is $M_2^{-1} M_1$. Coefficients in $M_1$ and $M_2$ can be solved for by deriving coefficients of generic matrix M that can convert between rgb and XYZ color space.

$$\begin{bmatrix} X \\ Y \\ Z \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} r \\ g \\ b \end{bmatrix}$$

where, $$X = \frac{xY}{y}$$

$$Y = Y$$

$$Z = \frac{(1-x-y)Y}{y}$$

For example, for a red of (1, 0, 0), green of (0, 1, 0), blue of (0, 0, 1), white of (1, 1, 1), and $Y_w=1$, the matrix coefficients can be solved from:

$$M = \begin{bmatrix} \frac{x_r}{y_r} Y_r & \frac{x_g}{y_g} Y_g & \frac{x_b}{y_b} Y_b \\ Y_r & Y_g & Y_b \\ \frac{1-x_r-y_r}{y_r} Y_r & \frac{1-x_g-y_g}{y_g} Y_g & \frac{1-x_b-y_b}{y_b} Y_b \end{bmatrix}$$

where, $$\begin{bmatrix} Y_r \\ Y_g \\ Y_b \end{bmatrix} = \begin{bmatrix} \frac{x_r}{y_r} & \frac{x_g}{y_g} & \frac{x_b}{y_b} \\ 1 & 1 & 1 \\ \frac{1-x_r-y_r}{y_r} & \frac{1-x_g-y_g}{y_g} & \frac{1-x_b-y_b}{y_b} \end{bmatrix}^{-1} \begin{bmatrix} \frac{x_w}{y_w} \\ 1 \\ \frac{1-x_w-y_w}{y_w} \end{bmatrix}$$

To determine the coefficient mapping matrix for $M_1$, values $x_r, y_r, x_g, y_g, x_b, y_b$ are from Table 1 are used in the formulas and Yr, Yg, and Yb are determined using the formula above. To determine the coefficient mapping matrix for $M_2$, the chromaticity values from EDID are used.

A graphics driver or application requested by the graphics driver can perform operations of processing block 304.

Pseudo code to determine the coefficient matrix is below.

```
function CAM = sRGB2display(disp_RGBW, input_CS)
rx = disp_RGBW(1);
ry = disp_RGBW(2);
gx = disp_RGBW(3);
gy = disp_RGBW(4);
bx = disp_RGBW(5);
by = disp_RGBW(6);
wx = disp_RGBW(7);
wy = disp_RGBW(8);
M = [rx/ry gx/gy bx/by; 1 1 1; (1-rx-ry)/ry (1-gx-gy)/gy
(1-bx-by)/by];
wrgb = [wx/wy 1 (1-wx-wy)/wy]';
Yrgb = inv(M)*wrgb;
Yr = Yrgb(1);
Yg = Yrgb(2);
Yb = Yrgb(3);
MM = [rx/ry*Yr gx/gy*Yg bx/by*Yb; Yr Yg Yb; (1-rx-ry)/ry*Yr
(1-gx-gy)/gy*Yg (1-
bx-by)/by*Yb];
% sRGB
if input_CS == 1
    % BT. 709 or sRGB
    M1=[0.4124  0.3576  0.1805
        0.2126  0.7152  0.0722
        0.0193  0.1192  0.9505];
else
    % BT. 601 (525 line)
    M1 =[0.3935  0.3653  0.1917
```

-continued

```
        0.2124  0.7011  0.0866
        0.0187  0.1119  0.9584];
end
M2 = MM;
CAM = inv(M2)*M1
```

Inverse gamma block 306 is to receive pixel data and apply inverse gamma correction to the pixel data to make pixel data linear. Inverse gamma block 306 is to output the linear pixel data to 3×3 CSC block 308. Because the photo and video contents are gamma corrected, inverse gamma correction is applied before applying color space conversion matrix. Processing block 304 can provide look up tables to inverse gamma block 306 to identify output inverse gamma values for incoming pixel data.

3×3 CSC block 308 is to receive linearized pixel data from inverse gamma block 306 and apply color correction to the pixel data based on the correction matrix from processing block 304. For example, 3×3 CSC block 308 can multiply input RGB values by a 3×3 matrix. Pixel data values from inverse gamma block 306 can be normalized to a range from 0 to 1. 3×3 CSC block 308 is also to map content color space to display color space in cases where content gamut is within display gamut or outside of display gamut.

In some cases, for linear mapping, content gamut is less than display gamut if the largest coefficient in the coefficient matrix is less than one. In some cases, for linear mapping, content gamut is greater than display gamut if the largest coefficient in the coefficient matrix is greater than one.

In an implementation, if content gamut is less than display gamut, content gamut space can be linearly increased to reach boundaries of the display gamut space in response to content gamut space being less than display gamut space. The largest value in the coefficient matrix can be identified and all values in the matrix are multiplied by the inverse of the largest value. Accordingly, the largest value in the coefficient matrix will be shifted to value 1.

In a case where the content gamut space is larger than display gamut space, a normalization factor is applied to every coefficient of the conversion matrix. Normalization shifts all the colors linearly to the display gamut boundary. For example, a normalization factor can be the inverse of the largest component of the conversion matrix (which will be larger than 1). Every coefficient value in the matrix can be multiplied by the normalization factor so that the largest coefficient value in the matrix is 1.

After color space conversion, gamma is re-applied to offset the display gamma and produce a linear output. Gamma block 310 is to apply gamma correction to the input pixel data after color conversion. In some embodiments, gamma block 310 can use one or more look up tables for each color for accurate gamma correction. For example, gamma block 310 can convert each pixel value from 3×3 CSC block 308 to a gamma corrected value using one or more look up tables of red, green, and blue color. Gamma correction values can be stored in the extended block of EDID, which is also defined in the EDID standard at section 1.4.

Inverse gamma block 306, 3×3 CSC block 308, gamma block 310 can be implemented by hardware in the display engine of graphics chip and programmed by the graphics driver.

Figure 3B:
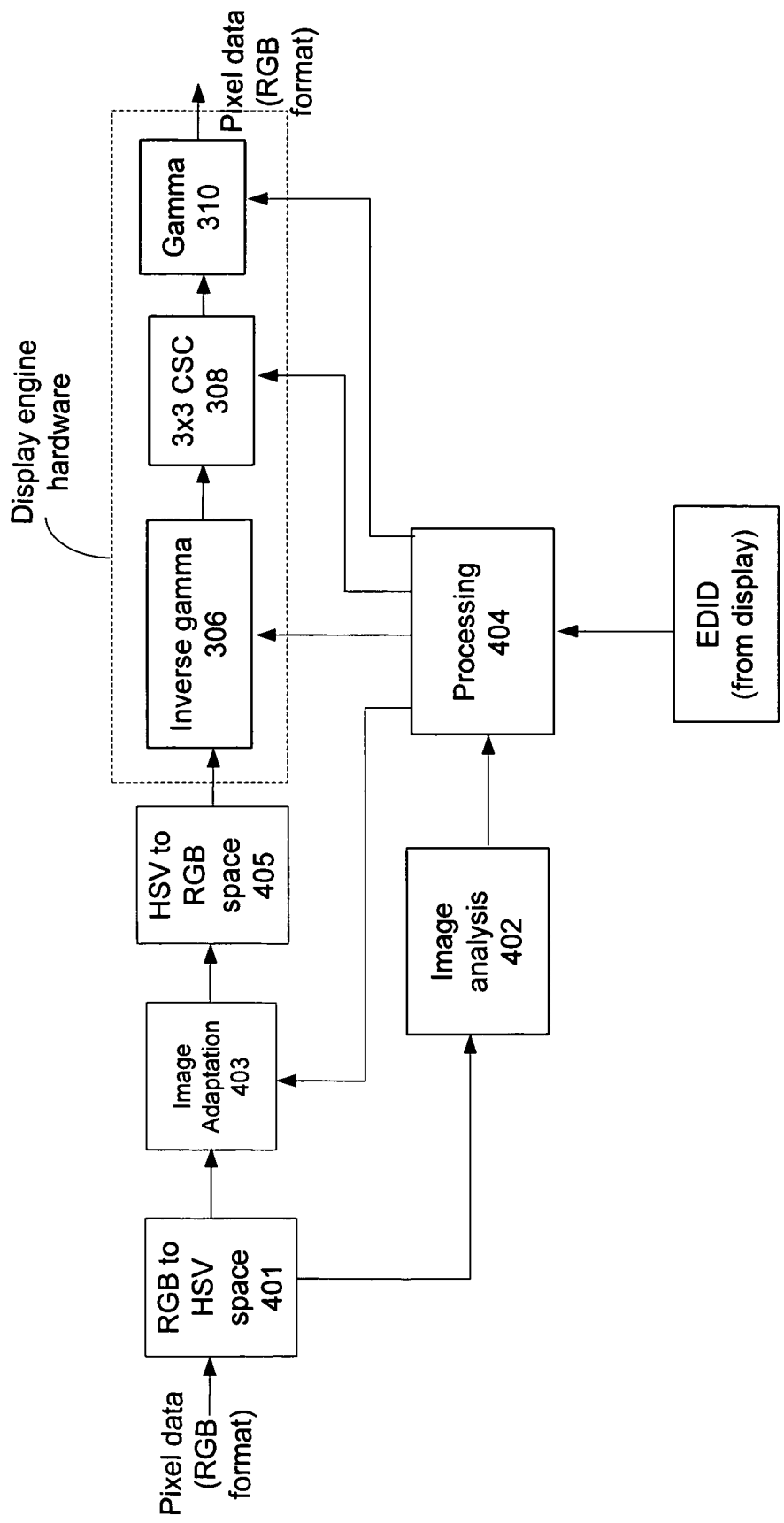
FIG. 3B depicts an example of a system that can be used to perform color correction when converting color of pixels from content gamut space to display gamut space and also apply multiple forms of pixel correction during conversion.

FIG. 3B depicts an example of a system that can be used to perform color correction when converting color of pixels from content gamut space to display gamut space and also apply multiple forms of pixel correction during conversion.

The system of FIG. 3B is similar to that of system 3A except for differences described below.

Figure 6:
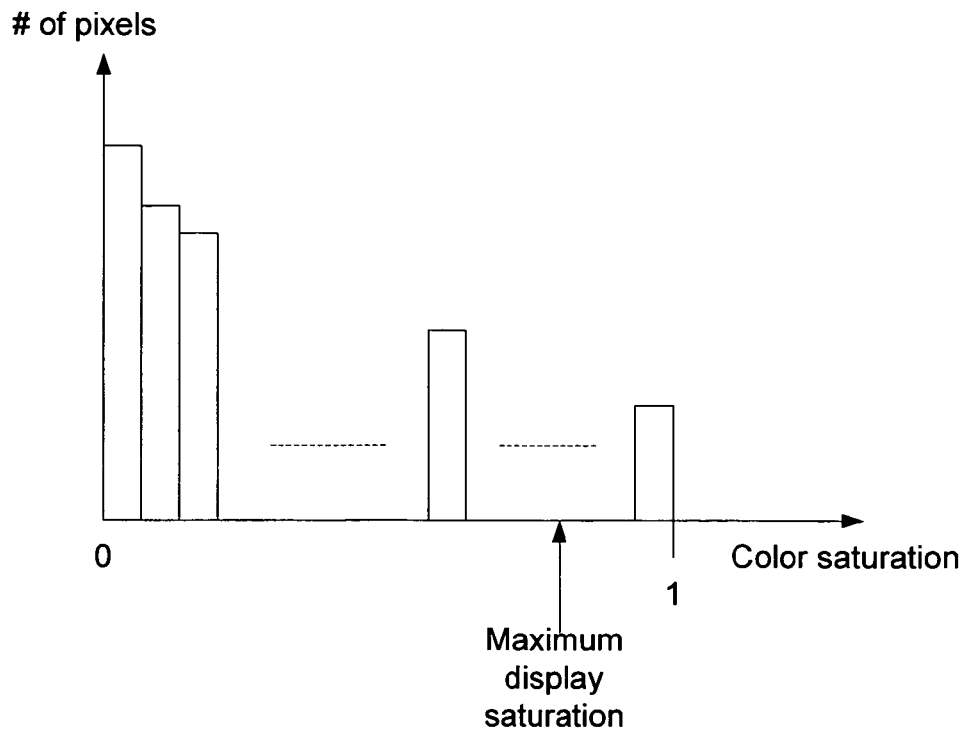
FIG. 6 depicts an example of a histogram of saturation values of a color.

RGB to HSV space conversion block 401 converts pixels from RGB space to HSV space. Image analysis block 402 receives pixel data in HSV format and builds one or more histograms based on the saturation values of pixels for each color. A full screen worth of pixels can be used to create a histogram for a specific color. For example, for each of red, green, blue, cyan, yellow, and magenta colors, histograms can be made to show saturation value distributions of pixels. Histograms can be based on HSV space. FIG. 6 depicts an example of a histogram of saturation values of a color. Color saturation values can range from 0 to 1. Image analysis block 402 passes the histogram information for each color to processing block 404.

Figure 5:
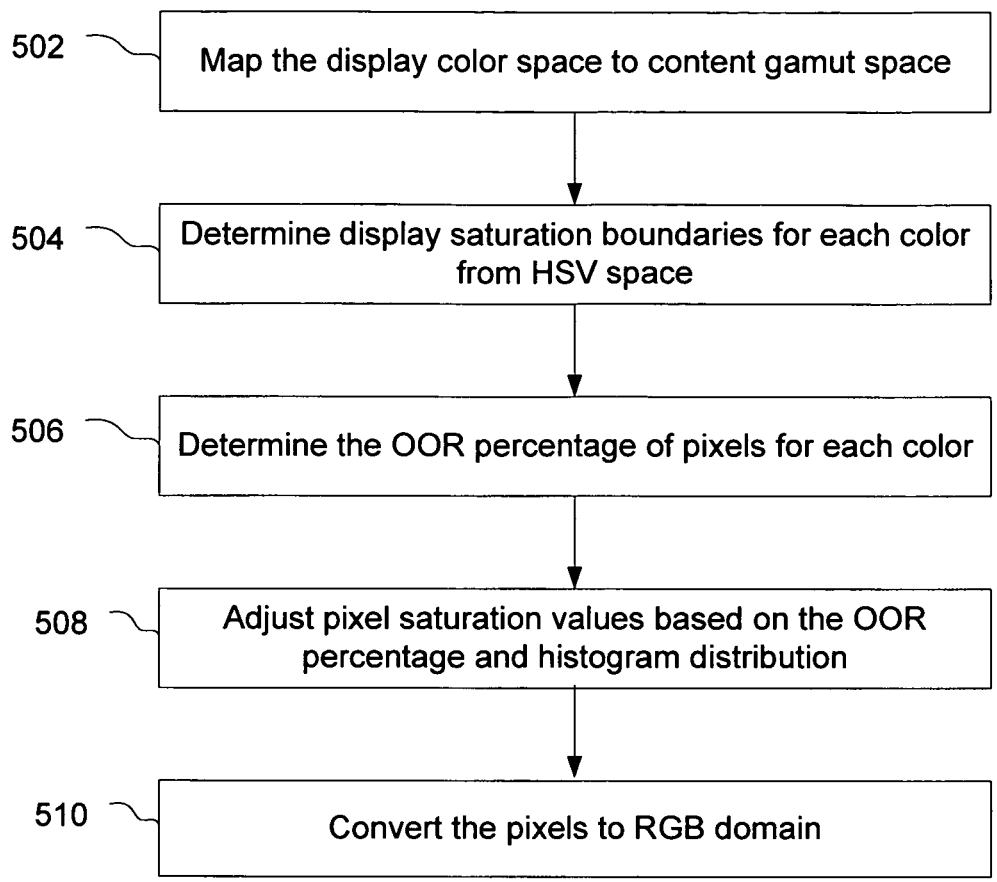
FIG. 5 depicts a process that can be used to determine pixel saturation values that are beyond a display saturation limit and determine a manner to correct saturation values.

Processing block 404 analyzes the histograms of each color and for each color, determines the maximum allowed saturation for the display based on the out of range pixel percentages in a manner described with regard to FIG. 5. Processing block 404 also programs image adaptation block 403 to adjust pixel saturation values based on techniques described with regard to block 508 of FIG. 5. Image adaption block 403 can be implemented through a saturation look up table (LUT) for each color segment. If the histogram is built on 6 color segments (RGBYCM), then 6 LUTs can be used.

Figure 7:
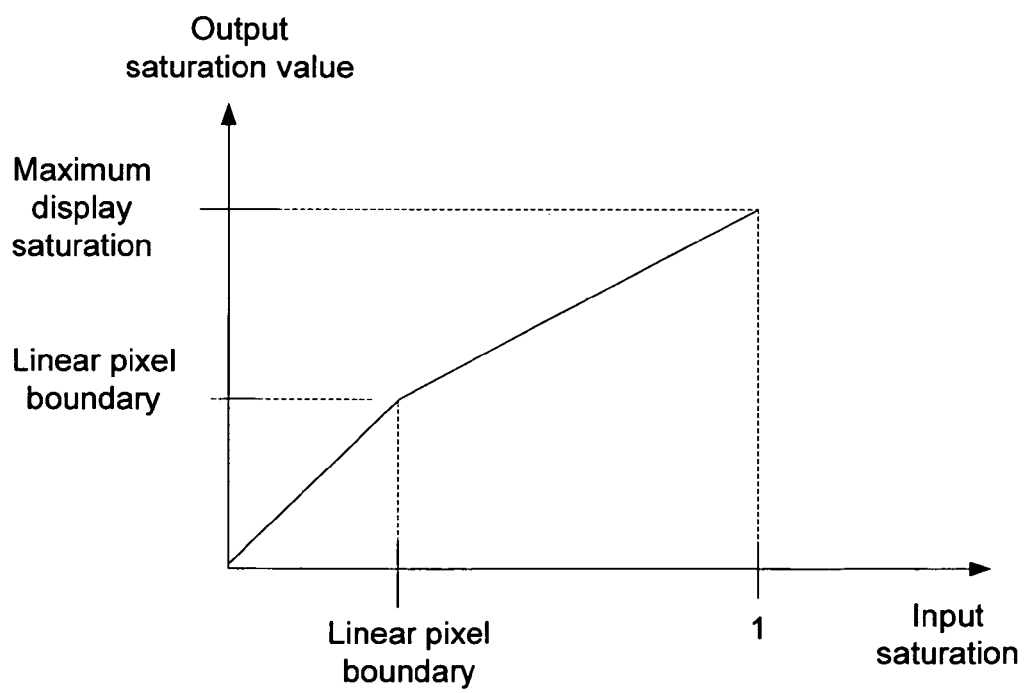
FIG. 7 provides an example of linear shifting of saturation values outside of the linear pixel boundary while keeping the saturation values inside the linear pixel boundary unchanged.

For example, FIG. 7 diagrams conversion from input to output saturation values in a saturation LUT. FIG. 7 provides an example of linear shifting of color values within and outside of the linear pixel boundary. In other embodiments, pixel values outside the linear pixel value can be shifted non-linearly up to the maximum display saturation value. For example, a parabolic conversion can be used.

Referring again to FIG. 3B, HSV to RGB space block 405 converts pixels back to RGB space from HSV space.

Processing block 404 also receives panel chromaticity and gamma data from the EDID as well as saturation distribution information for colors from image analysis block 402. Processing block 404 also determines matrix coefficient values used by 3×3 CSC block 308 in a similar manner as that described with regard to processing block 304 of FIG. 3A. In addition, processing block 404 programs inverse gamma block 306 and gamma block 310 in similar manners as described with regard to processing block 304 of FIG. 3A.

FIG. 5 depicts a process that can be used to determine pixel saturation values that are beyond a display saturation limit and determine a manner to correct saturation values. Block 502 includes mapping the display color space to content gamut space. For example, for the sake of illustration, an example coefficient mapping matrix provided to 3×3 CSC block 308 can be:

$$\begin{bmatrix} 0.8588 & 0.1634 & 0.0018 \\ 0.364 & 0.9331 & 0.0347 \\ -0.0007 & -0.0199 & 0.9074 \end{bmatrix}$$

From the above mapping matrix, the maximum red color that the display can reproduce is (0.8588, 0.0364, −0.0007) in RGB space. However, in content color space of sRGB, the saturated red color is represented as (1, 0, 0).

Figure 4:
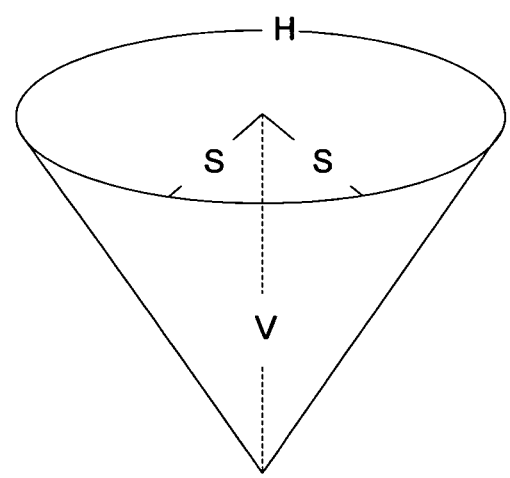
FIG. 4 depicts an example of HSV space.

Block 504 includes determining display saturation boundaries for each color from HSV space. To determine the saturation value for each color, the boundary of display in HSV color space is determined. H is hue, S is color saturation, and V is brightness. An example of HSV space is shown in FIG. 4.

The saturated red color in content color space corresponds to saturation 1 at hue angle 30/360°. Expressions used to convert RGB space to HSV space are well known. For example, the expressions can be:

$$h = \begin{cases} 0, & \text{if max} = \text{min} \\ \left(60° \times \frac{g-b}{\max - \min} + 360°\right) \bmod 360° & \text{if max} = r \\ 60° \times \frac{b-r}{\max - \min} + 120°, & \text{if max} = g \\ 60° \times \frac{r-g}{\max - \min} + 240°, & \text{if max} = b \end{cases}$$

$$s = \begin{cases} 0, & \text{if max} = 0 \\ \frac{\max - \min}{\max} = 1 - \frac{\min}{\max}, & \text{otherwise} \end{cases}$$

$$v = \max$$

where,
max is the maximum pixel value for a color and
min is the minimum pixel value for a color.

In the example above, the maximum saturation of the red color that the display can reproduce can be determined by converting the maximum display red color coordinate in RGB space, that is (0.8588, 0.0364, −0.0007), to HSV space. The saturation value for red is the s value in HSV space. In this way, the display saturation boundary of the red color can be determined. Similar techniques can be applied to determine display saturation boundaries of other colors. Depending on the designer's preference, saturation boundaries can be defined for red, green, blue, and other colors.

Block 506 includes determining the out-of-range (OOR) percentage of pixels for each color. Histograms can be used to determine the percentage of pixels in the content gamut space with saturation values that are inside and outside of the display saturation boundaries for each color. FIG. 6 depicts an example of a histogram of pixel values for a color.

Block 508 includes adjusting pixel colors based on the OOR percentage and histogram distribution. For each color, the percentage of pixels outside the display saturation boundary (OOR percentage) is used as a parameter to determine a linear pixel boundary value. For example:

linear pixel boundary value=1−OOR percentage/100.

In this example, an OOR percentage of 10% corresponds to a linear pixel boundary value of 0.9. Pixels with saturation color values less than this linear pixel boundary value are converted 1:1. Pixels with saturation color values greater than this linear pixel boundary value are converted linearly according to:

Output saturation value=linear pixel boundary value+
(maximum display saturation value−linear pixel
boundary value)/(1−linear pixel boundary value)

Block 510 includes converting the pixels back to RGB domain.

Figure 8:
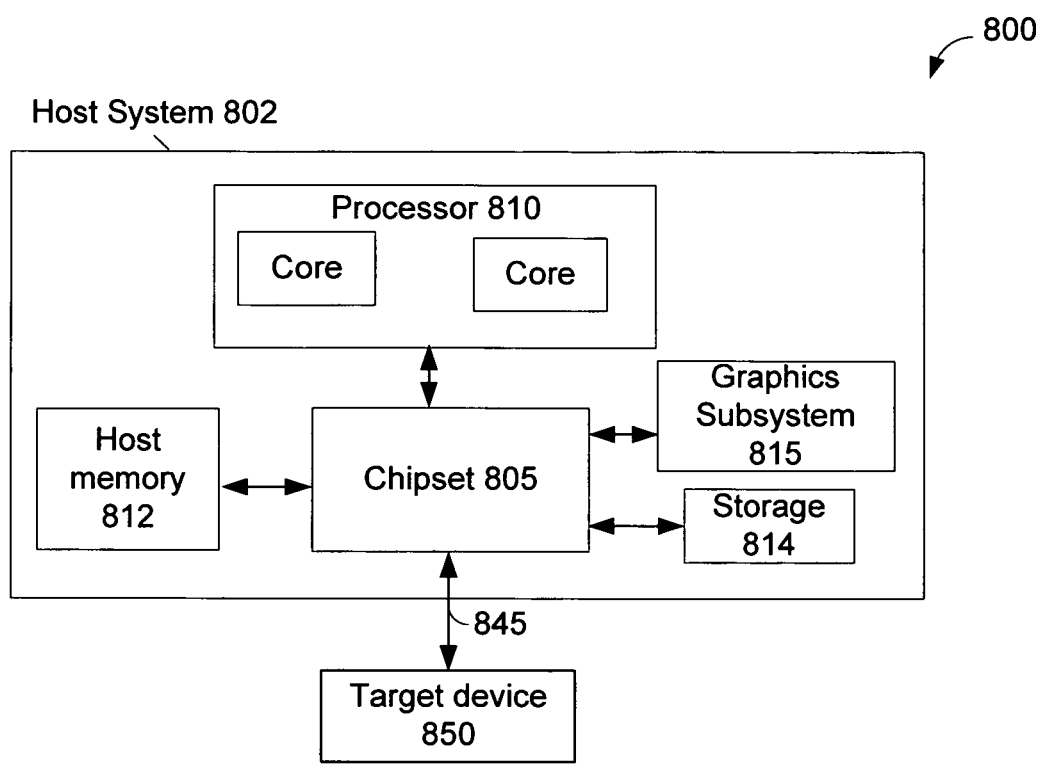
FIG. 8 depicts a system in accordance with an embodiment.

FIG. 8 depicts a system 800 in accordance with an embodiment. System 800 may include a source device such as a host system 802 and a target device 850. Host system 802 may include a processor 810 with multiple cores, host memory 812, storage 814, and graphics subsystem 815. Chipset 805 may communicatively couple devices in host system 802. Graphics subsystem 815 may process video and audio. Although not depicted, system 802 may receive video, images, or audio through a wired or wireless interface. Interface 845 may provide a wired or wireless interface between host system 802 and target device 850. Target device 850 may be a display device with capabilities to display visual content and broadcast audio content. In addition, system 800 may also include one or more antennae and a wireless network interface coupled to the one or more antennae (not depicted) or a wired network interface (not depicted) for communication with other devices.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment: For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
adjusting pixel saturation values of pixels, the adjusting comprising:
for each color:
determining a display saturation level in HSV color space;
determining a percentage of pixel saturation levels outside of the display saturation level;
determining a linear pixel value based on the percentage;
for each pixel with a saturation color value less than the linear pixel value, maintaining its saturation color value; and
scaling saturation levels of pixels outside the linear pixel value;
converting pixels from HSV to the RGB domain;
accessing an sRGB gamut color table;
accessing primary colors and gamma values associated with the display from a memory;
determining a color conversion matrix based on the sRGB gamut color table and chromaticity values of RGBW primary colors associated with the display;
applying color space conversion on pixels for conversion to the display color space in a content color space based on the color conversion matrix;
applying linear correction to the pixels;
applying gamma correction to the color space converted and linear corrected pixels based on the gamma values associated with the display; and
providing color, linear corrected, and gamma corrected pixels for display.

2. The method of claim 1, wherein the accessing primary colors and gamma values associated with a display from a memory comprises:
accessing primary colors and gamma values stored in a table in compliance with Section 3.7 of VESA E-EDID Version 1, Rev 4 (2006).

3. The method of claim 1, wherein the applying linear correction to pixels comprises applying linear correction of pixels in response to content gamut space being less than display gamut space and comprises:
determining a normalization value equal to the largest coefficient value in the color conversion matrix and
multiplying all coefficient values in the color conversion matrix by an inverse of the normalization value.

4. The method of claim 1, wherein the applying linear correction to pixels comprises applying linear correction of pixels in response to content gamut space being greater than display gamut space and comprises:
determining a normalization value equal to the largest coefficient value in the color conversion matrix and
multiplying all coefficient values in the color conversion matrix by an inverse of the normalization value.

5. The method of claim 1, wherein the scaling saturation levels of pixels outside the linear pixel value comprises:
linearly scaling pixel saturation levels outside the linear pixel value and
setting a maximum pixel saturation level to the display saturation level.

6. The method of claim 1, wherein the scaling saturation levels of pixels outside the linear pixel value comprises:
non-linearly scaling pixel saturation levels outside the linear pixel value and
setting a maximum pixel saturation level to the display saturation level.

7. The method of claim 1, wherein the linear pixel value determined as: 1−the percentage/100.

8. A system comprising:
a display;
a host system comprising a wireless network interface and configured to:

adjust pixel saturation values of pixels, wherein to adjust pixel saturation values of pixels, the host system is to:

for each color:
    determine a display saturation level in HSV color space;
    determine a percentage of pixel saturation levels outside of the display saturation level;
    determine a linear pixel value based on the percentage;
    for each pixel with a saturation color value less than the linear pixel value, maintain its saturation color value; and
    scale saturation levels of pixels outside the linear pixel value;

convert pixels from HSV to the RGB domain;
access an sRGB gamut color table;
access primary colors and gamma values associated with the display from a memory;
determine a color conversion matrix based on the sRGB gamut color table and chromaticity values of RGBw primary colors associated with the display;
apply color space conversion on pixels for conversion to the display color space in a content color space based on the color conversion matrix;
apply correction to pixels;
apply gamma correction to the color space converted and corrected pixels based on the gamma values associated with the display; and
provide color space converted, corrected, and gamma corrected pixels to the display.

9. The system of claim 8, wherein to access primary colors and gamma values associated with a display from a memory, the host system is to:
access primary colors and gamma values stored in a table in compliance with Section 3.7 of VESA E-EDID Version 1, Rev 4 (2006).

10. The system of claim 8, wherein to apply correction to pixels, the host system is to:
determine a normalization value equal to the largest coefficient value in the color conversion matrix and
multiply all coefficient values in the color conversion matrix by an inverse of the normalization value.

11. The system of claim 8, wherein to scale saturation levels of pixels outside the linear pixel value, the host system is to:
linearly or non-linearly scale pixel saturation level outside the linear pixel value and
set a maximum pixel saturation level to the display saturation level.

12. An apparatus comprising:
a display, a memory, and circuitry, the circuitry executes logic to:
    adjust pixel saturation values of pixels, wherein to adjust, the circuitry is to:
    for each color:
        determine the display saturation level in HSV color space;
        determine a percentage of pixel saturation levels outside of the display saturation level;
        determine a linear pixel value based on the percentage;
        for each pixel with a saturation color value less than the linear pixel value, maintain its saturation color value; and
        scale saturation levels of pixels outside the linear pixel value;
    convert pixels from HSV to the RGB domain;
    access an sRGB gamut color table;
    access primary colors and gamma values associated with the display from the memory;
    determine a color conversion matrix based on the sRGB gamut color table and chromaticity values of RGBW primary colors associated with the display;
    apply color space conversion to pixels for conversion to the display color space in a content color space based on the color conversion matrix;
    apply correction to pixels;
    apply gamma correction to the color space converted and corrected pixels based on the gamma values associated with the display; and
    provide color space converted, corrected, and gamma corrected pixels for display.

13. The apparatus of claim 12, wherein to access primary colors and gamma values associated with a display from a memory, the circuitry is to:
access primary colors and gamma values stored in a table in compliance with Section 3.7 of VESA E-EDID Version 1, Rev 4 (2006).

14. The apparatus of claim 12, wherein to apply correction to pixels, the circuitry is to:
determine a normalization value equal to the largest coefficient value in the color conversion matrix and
multiply all coefficient values in the color conversion matrix by an inverse of the normalization value.

15. The apparatus of claim 12, wherein to scale saturation levels of pixels outside the linear pixel value, the circuitry is to:
linearly scale pixel saturation levels outside the linear pixel value and
set a maximum pixel saturation level to the display saturation level.

16. The apparatus of claim 12, wherein to scale saturation levels of pixels outside the linear pixel value, the circuitry is to:
non-linearly scale pixel saturation levels outside the linear pixel value and
set a maximum pixel saturation level to the display saturation level.

* * * * *